(12) United States Patent
Gibeau

(10) Patent No.: US 7,079,015 B2
(45) Date of Patent: Jul. 18, 2006

(54) SYSTEM FOR CONNECTING WIRELESS DEVICES TO A VEHICLE

(75) Inventor: John Gibeau, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 163 days.

(21) Appl. No.: 10/604,048

(22) Filed: Jun. 24, 2003

(65) Prior Publication Data

US 2004/0264387 A1 Dec. 30, 2004

(51) Int. Cl.
*B60Q 1/00* (2006.01)

(52) U.S. Cl. .............................. 340/425.5; 340/539.11; 340/539.22; 340/686.6; 455/569.2

(58) Field of Classification Search ........... 340/539.11, 340/539.23, 686.6, 5.2, 426.24, 426.28, 3.1; 455/569.2
See application file for complete search history.

(56) References Cited

U.S. PATENT DOCUMENTS

| | | | |
|---|---|---|---|
| 4,962,523 A | 10/1990 | Tanaka | |
| 5,261,121 A | 11/1993 | Hashimoto | |
| 5,991,640 A * | 11/1999 | Lilja et al. .................. | 455/557 |
| 6,032,054 A * | 2/2000 | Schwinke ................... | 455/557 |
| 6,542,758 B1 * | 4/2003 | Chennakeshu et al. .. | 455/569.2 |
| 6,600,430 B1 * | 7/2003 | Minagawa et al. ......... | 340/988 |
| 6,792,296 B1 * | 9/2004 | Van Bosch .............. | 455/569.2 |
| 6,892,051 B1 * | 5/2005 | Schmitt et al. ............ | 455/41.2 |
| 6,965,787 B1 * | 11/2005 | Kindo et al. ............. | 455/569.2 |
| 2001/0020891 A1 * | 9/2001 | Minagawa et al. ........ | 340/5.61 |
| 2003/0098784 A1 * | 5/2003 | Van Bosch et al. ...... | 340/425.5 |
| 2003/0114202 A1 * | 6/2003 | Suh et al. .................... | 455/569 |
| 2003/0224726 A1 * | 12/2003 | Shearer et al. ............. | 455/41.1 |
| 2003/0224840 A1 * | 12/2003 | Frank et al. ............. | 455/575.9 |
| 2003/0224841 A1 * | 12/2003 | Suenaga ................... | 455/575.9 |
| 2003/0228879 A1 * | 12/2003 | Witkowski et al. ...... | 455/550.1 |
| 2004/0092230 A1 * | 5/2004 | Miyazaki et al. .......... | 455/41.2 |
| 2004/0102227 A1 * | 5/2004 | Schlegel ................... | 455/569.1 |
| 2004/0203351 A1 * | 10/2004 | Shearer et al. ............. | 455/41.1 |

FOREIGN PATENT DOCUMENTS

JP 2001-244877 A * 9/2001

OTHER PUBLICATIONS

"Bluetooth heads for cars", by Jorgen Sundgot, Nov. 7, 2001, www.infosyncworld.com/news/n/1081.html, 1 page.*
"Hands Free Group Adopts Bluetooth Wireless Technology", Feb. 21, 2002, www.theautochannel.com/news/2002/02/21/036075.html, 2 pages.*

* cited by examiner

*Primary Examiner*—Benjamin C. Lee
(74) *Attorney, Agent, or Firm*—Jennifer M. Stec; Brooks & Kushman

(57) ABSTRACT

A method and system relating to connecting a wireless device carried by an individual to a vehicle network by providing a hands-free feature for notifying a vehicle module of the presence of a wireless device. In response to the notification, the vehicle module can connect the wireless device to the vehicle network through a wireless link.

18 Claims, 1 Drawing Sheet

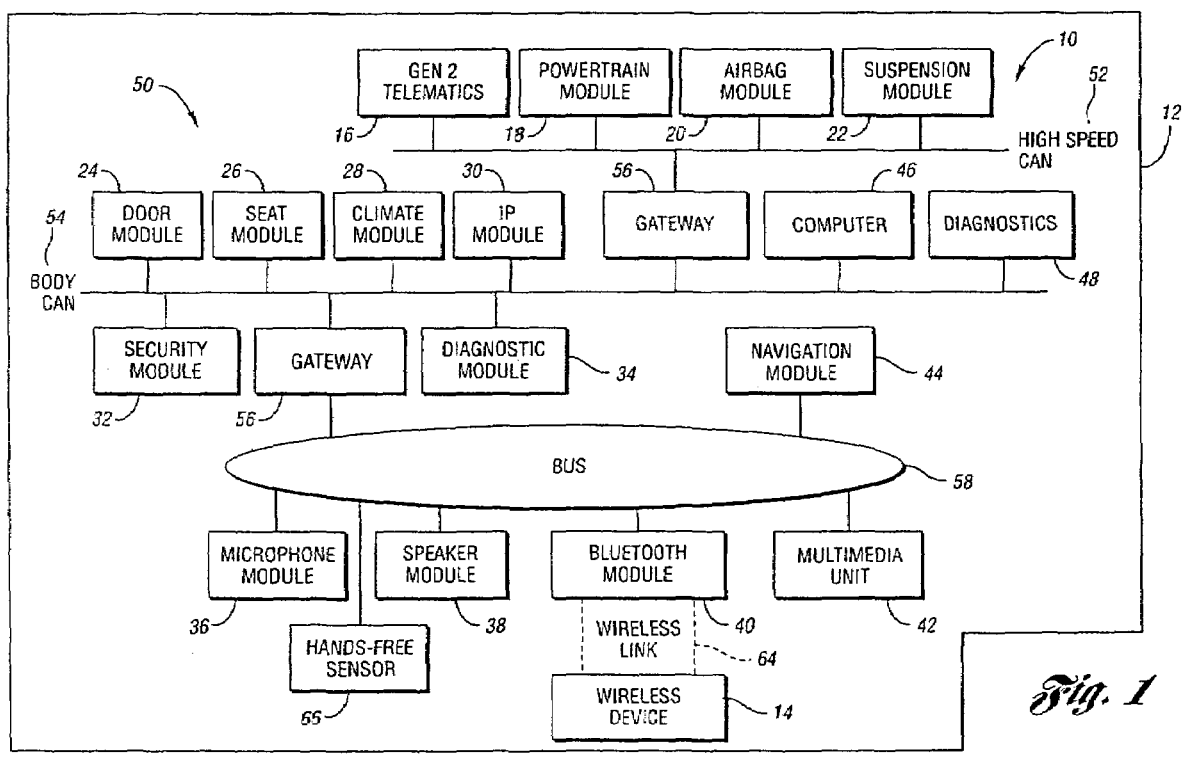

SYSTEM FOR CONNECTING WIRELESS DEVICES TO A VEHICLE

BACKGROUND OF INVENTION

1. Field of the Invention

The present invention relates to a system for connecting a wireless device carried by an individual to a vehicle network.

2. Background Art

Today's vehicles include a number of modules that perform various functions associated with the operation of a vehicle. Some of the vehicle modules may even be capable of operating with other remotely located wireless devices. In particular, more and more wireless devices, such as personal digital assistants or cellular phones, are including capabilities for operating with the vehicle modules.

If the vehicle modules are aware of the presence of the wireless device, a wireless link can be set up between the wireless device and the vehicle modules for communicating signals to each other for operation. While pressing a button on the instrument panel is a common way to notify the vehicle modules of the presence of the wireless device, such a process requires affixing an addition button to an already button-full vehicle. Moreover, when the individual carrying the wireless device is entering the vehicle, the individual may not have a hand free to press the button.

SUMMARY OF INVENTION

The present invention overcomes the above-identified deficiencies by providing a hands-free system for notifying a vehicle module of the presence of a wireless device and for connecting the wireless device to a vehicle network so that the vehicle module can operate with the wireless device.

One aspect of the present invention relates to a system for use in a vehicle for connecting a wireless device carried by an individual to a vehicle network. The system comprises a hands-free sensor for generating a sensor signal indicating the individual's position within a predefined distance relative to the vehicle. In addition, the system comprises a module enabled based on the sensor signal for determining whether the individual is carrying the wireless device. If the individual is determined to be carrying the wireless device, the module can connect the wireless device carried by the individual to the vehicle network.

Another aspect of the present invention relates to a method for use in a vehicle for connecting a wireless device carried by a individual to a vehicle network. The method comprises configuring a module to be enabled based on a hands-free sensor signal for determining whether the individual is within a predefined distance relative to the vehicle. In addition, the method further comprises configuring the module for determining whether the individual within the predefined distance is carrying the wireless module and for connecting the wireless device determined to be carried by the individual to the vehicle network.

Another aspect of the present invention relates to a system for use with a vehicle for connecting a Bluetooth enabled wireless phone carried by an individual to a vehicle network. The system comprises a door sensor for generating a door open signal indicating the opening of a vehicle door. In addition, the system comprises a module connected to the vehicle network and receiving the door open signal through the vehicle network. The module determines whether the individual is conducting a phone conversation using a wireless phone by transmitting a wireless inquiry signal to the phone upon receipt of the door open signal. Furthermore, the system comprises a Bluetooth wireless link between the module and the Bluetooth enabled wireless phone. The wireless link is provided by the module in response to the module receiving the door open signal and determining the individual is conducting the phone conversation with the wireless phone. Still further, the system comprises a speaker module and a microphone module connected to the vehicle network. An audio component of the phone conversation is transferred through the wireless link to the vehicle network for continuing the phone conversation within the vehicle through the speaker module and the microphone module.

BRIEF DESCRIPTION OF DRAWINGS

FIG. 1 illustrates a system for connecting a wireless device carried by an individual to a vehicle network, in accordance with the present invention.

DETAILED DESCRIPTION

FIG. 1 illustrates a system 10 for use with a vehicle 12 according to one aspect of the present invention. The system 10 can be used with any type of vehicle having at least one module that is capable of wireless communication with a remotely located wireless device 14 that is not permanently affixed to the vehicle. The examples provided below relate to an automobile, but the present invention not limited to automobiles.

The vehicle 12 can include a number of modules that perform various functions associated with the operation of the vehicle 12. Some or all of the number of modules can include capabilities for operating with the remotely located wireless device 14. While the vehicle 12 can include any number of modules, the modules shown include a telematics module 16, a powertrain module 18, an air bag module 20, a suspension module 22, a door module 24, a seat module 26, a climate module 28, an instrument panel module 30, a security module 32, a diagnostics module 34, a microphone module 36, a speaker module 38, a Bluetooth module 40, a multimedia unit module 42, a navigation module 44, a computer module 46, and a diagnostics module 48.

The modules are connected together by what can be generally referred to as a vehicle network 50. The vehicle network 50 can integrate the operations and functions performed by each module by providing a communication structure that links the modules together, or a selected number of the modules, for receiving and transmitting signals between connected modules and other devices that may be connected to or in communication with the vehicle network 50.

The vehicle network 50 shown includes different types of connecting means between the modules, such as a high speed control area network (CAN) 52, a body CAN 54, multiple gateways 56, and a bus 58. Depending on a module's functional capabilities and authorizations, the module can be used to interact with the signals passing through the vehicle network for responding to the signals or for relaying the signals to other modules. In some cases, the modules can generate controls signal or transmit received control signals to the vehicle network for use in controlling other modules connected to the vehicle network 50.

One aspect of the present invention relies on Bluetooth protocols for setting up a wireless link 64 between one of the modules connected to the vehicle network 50 and a remotely located wireless device 14. Through the wireless link 64, the remotely located wireless device 14 can send and receive signals from at least one Bluetooth enabled vehicle module. As illustrated, the vehicle includes the Bluetooth module 40 for this purpose.

The Bluetooth module 40 can understand the signals communicated from the wireless device 14 over the wireless link 64. The Bluetooth module 40 translates the signals for transmission over the vehicle network 50 for use in operating with or controlling other modules connected to the vehicle network. In addition, the Bluetooth module 40 can translate signals received from the other vehicle modules for transmission to the remotely located wireless device 14 for use in operating with or controlling the wireless device 14. In addition to Bluetooth protocols for wireless communication, the present invention may operate with other wireless protocols, such as IEEE 802.11b.

The Bluetooth module 40 is described as a separate vehicle module, but each of the other vehicle modules could be configured with Bluetooth capabilities for direct communication with the wireless device 14 or for similarly connecting with the wireless device 14 and translating the communications from the wireless device 14 for transmission through the vehicle network 50 for operating with the other vehicle modules.

In order to set up the wireless link 64, both devices must include antennas or other structures allowing communication under the defined specifications and standards for Bluetooth transmissions. The standards and structures for wireless communication are commonly known in the art.

Another aspect of the present invention relates to determining the presence of the remotely located wireless device 14 in a hands-free manner. The hands-free manner permits the wireless link 64 to be set up for connecting the wireless device 14 to the vehicle network 50 without an individual carrying the wireless device 14 having to press any button or perform any volitional task.

To discover the presence of wireless device 14, the present invention includes a hands-free sensor 66 for generating a sensor signal indicating the individual is positioned within a predefined distance relative to the vehicle 14. The sensor 66 can only be engaged from predetermined positions; as such, the sensor signal can reflect whether the individual is within a predefined distance relative to the vehicle 12.

The sensor 66 can be any type of sensor that can be located on the vehicle 12, as shown, or remote from the vehicle 12, such as, in the wireless device 14 or elsewhere. The sensor can be a motion detector, a door-switch, a signal generator on the wireless device, a seat weight sensor, an ignition sensor, a window sensor, a door-lock state sensor, body temperature sensor, a heart rate sensor, a combination of these sensors, and the like. Each one of these sensors generates a corresponding sensor signal, the generation of the sensor signal can be used for determining the presence of the individual.

In response to determining the presence or known distance of the individual relative to the vehicle 12, a module, such as the Bluetooth module 40, can keep track of the sensor signal for determining whether the individual desires to sit in the vehicle and whether the individual desires to exit the vehicle.

The sensor 66 can be used to determine whether the individual desires to sit in the vehicle 12 by understanding the recurrence of the sensor signal. As described above, the sensors 66 can be any number of different sensors or combination of sensors. Accordingly, one or more sensor signals can be received by the module 40 for determining whether the individual desires to sit in the vehicle 12.

A door sensor and a weight sensor determines an individual desires to sit in the vehicle when the module 40 receives a door open signal followed by a weight signal indicating the presence of weight on the seat after the door opening. The door sensor and a heart rate sensor determines an individual desires to sit in the vehicle when the module receives the door open signal followed by a heart rate signal indicating the detection of a heart rate after the door opening. The door sensor and an infrared body sensor determines an individual desires to sit in the vehicle when the module receives the door open signal followed by an infrared signal indicating detection of a body in the vehicle after the door opening. The door sensor and a vehicle ignition/powering sensor determines an individual desires to sit in the vehicle when the module receives the door open signal followed by an ignition/powering signal indicating turning on of the engine after the door opening. The door sensor and a break pedal sensor determine an individual desires to sit in the vehicle when the module receives the door open signal followed by a break pedal signal indicating the depression of the break pedal after the door opening. The door sensor and a voice command sensor determines an individual desires to sit in the vehicle when the module receives the door open signal followed by an audio pickup signal indicating a voice command after the door opening. The door sensor, a door handle sensor, and a door unlock sensor determines an individual desires to sit in the vehicle when the module receives the door unlock signal followed by the door open signal indicating the door opening occurring with a door handle actuation signal indicating door handle actuation to open the door. These and other sensors and combinations of sensors can be used to determine whether a person desires to sit vehicle and are not intended or contemplated to limit the scope of the present invention.

Once the individual is determined to desire to sit in the vehicle 12, the Bluetooth module 40 executes a sequence of Bluetooth protocols that causes the Bluetooth module to begin a polling operation for determining whether the individual is carrying a Bluetooth enabled wireless device. The polling operation sends an inquiry out to the area surrounding the vehicle 12 that requests any other Bluetooth enabled devices within the area to respond. If the individual is carrying the wireless device 14, it can respond to the inquiry. In response to an affirmative reply, another Bluetooth protocol is executed for conducting a handshaking exercise that determines whether the wireless device 14 and the Bluetooth module 40 are authorized to set up the wireless link 64 with each other. Once authorized, the wireless link 64 can be set up, and additional inquiries can be communicated during the setup for determining what type of operation or transaction is to take place.

For personal digital assistants, the wireless link can be used to connect the assistant to the vehicle network 50 for interacting with the computer module 40 or the diagnostics module 48. For a wireless phone, once the authorization occurs, additional communications occur to determine whether a phone conversation is taking place on the wireless phone. If a phone conversation is taking place, the wireless link 64 can be used to transfer an audio component of the phone conversation to the vehicle network 50 for continuing the conversation using the microphone module 36 and the speakers module 48 in the vehicle 12. When the individual desires to enter the vehicle while conducting a phone conversation on an authorized wireless phone, the phone conversation can be continued in the vehicle in a hands-free manner without the individual carrying the phone having to press a button or perform any other volitional task.

The sensor 66 can also be used to determine whether the individual desires to exit the vehicle 12 by understanding the recurrence of the sensor signal or combination of the sensor signals. Accordingly, one of the sensor signals can be received by the Bluetooth mobile 40 for determining whether the individual desires to exit the vehicle.

The door sensor and the weight sensor determine an individual desires to exit the vehicle when the module receives the door open signal followed by the weight signal indicating the loss of the previous seat weight. The door sensor and the heart rate sensor determine an individual desires to exit the vehicle when the module receives the door open signal followed by the heart rate signal indicating the loss of the previous detection of the heart rate. The door sensor and the infrared body sensor determine an individual desires to exit the vehicle when the module receives the door open signal followed by receipt of the infrared body detection signal indicating loss of the previously detected body. The door sensor and the vehicle ignition/power sensor determine an individual desires to exit the vehicle when the module receives the door open signal followed by the vehicle power/ignition sensor indicating the loss of the previous vehicle power in signal. The door sensor and the brake sensor determine an individual desires to exit the vehicle when the module receives the open signal followed by the brake signal indicating loss of the previous brake depression. The door sensor and the voice command sensor determine an individual desires to exit the vehicle when the module receives the door open signal followed by the audio pickup signal indicating loss of the previous voice sound. These and other sensors and combinations of sensors can be used to determine whether a person desires to exit the vehicle and are not intended or contemplated to limit the scope of the present invention.

Once the Bluetooth module 40 is aware that the individual desires to exit the vehicle 12, the Bluetooth module 40 disconnects the wireless link 64 between the Bluetooth module and the remotely located wireless device 14. The Bluetooth module 40 can disconnect the wireless link 64 in a manner that the transaction taking place between the remotely located device 14 and the vehicle network can be transferred to the remotely located device 14 without interrupting the operation.

With respect to a phone conversation being conducted in a hands-free manner using the microphone module 36 and the speakers module 38, the audio component of the phone conversation can be transferred back to the wireless phone for continuing the phone conversation through the wireless phone without the individual having to press a button or otherwise perform a volitional task. If the vehicle modules are being used instead of the remotely located device 14 for conducting the operations that are normally performed on the remotely located device 14, when the wireless link 64 is disconnected, such operations can be continued on the remotely located device 14 instead of the vehicle modules without interrupting the performance of the operation.

While the best mode for carrying out the invention has been described in detail, those familiar with the art to which this invention relates will recognize various alternative designs and embodiments for practicing the invention as defined by the following claims.

The invention claimed is:

1. A system for use with a vehicle and a wireless phone having capabilities for conducting a phone call over an electronic phone network external to the vehicle, the system comprising:

a hands-free sensor for generating a sensor signal indicating an individual is positioned within a predefined distance relative to the vehicle; and a vehicle mounted module responsive to the sensor and configured to detect whether the individual is conducting the phone call, and if the individual is conducting the phone call, to establish a wireless link between the wireless phone and an in-vehicle network such that an audio component of the phone call is interfaced through a speaker and microphone connected to the in-vehicle network in order to support hands-free communications between the individual and the wireless phone; and wherein the wireless phone simultaneously interfaces the audio component of the phone call with the electronic phone network such that no direct communications are required between the in-vehicle network and the electronic phone network, thereby requiring the wireless phone to support simultaneous communications between the module and the external phone network.

2. The system of claim 1 further comprising the module being configured to interpret the sensor signal to determine whether the individual desires to sit in the vehicle and whether the individual desires to exit the vehicle.

3. The system of claim 2 further comprising the module being a Bluetooth enabled module configured to create the wireless link between the Bluetooth enabled module and the wireless phone for connecting the wireless phone to the in-vehicle network when the individual is carrying the wireless phone and desires to sit in the vehicle.

4. The system of claim 3 further comprising the Bluetooth enabled module being configured for disconnecting the wireless link when the individual desires to exit the vehicle such that the simultaneous interfacing of the audio component between the wireless phone and the external phone network allows the phone call to be continued in a non-hands-free manner directly between the wireless phone and the external phone network.

5. The system of claim 2 further comprising the hands-free sensor being a door switch.

6. The system of claim 2 further comprising the hands-free sensor being a motion detector.

7. The system of claim 2 further comprising the hands-free sensor being a seat weight sensor.

8. The system of claim 1 wherein the module is further configured to automatically interface the audio component of the phone call to the in-vehicle network so that the phone call is carried out in a hands-free manner without requiring user action to communicate the audio component of the phone call over the speaker and microphone module.

9. A method of interfacing an audio component of a phone call carried out on a wireless phone with a speaker and microphone mounted in a vehicle, the method comprising:

detecting whether an individual approaching the vehicle as a function of signals generated by a hands-free sensor;

upon detecting the individual, detecting whether the individual is conducting the phone call on the wireless phone as a function of signals emitted from the phone to a vehicle mounted module;

if the individual is conducting the phone call, simultaneously providing a first wireless link between the wireless phone and the vehicle mounted module and a second wireless link between the wireless phone and an electronic phone network external to the vehicle; and simultaneously interfacing an audio component of the phone call over both of the first and second communications links in order to support hands-free operation through the speaker and microphone and communications between the wireless phone and the external phone network such that no direct communications are required between the module and the electronic phone network in order to support the hands-free operation.

10. The method of claim 9 further comprising detecting whether the individual is approaching the vehicle as a function of a hands-free signal generated by a hands-free sensor.

11. The method of claim 10 further comprising configuring the module to interpret the sensor signal to determine whether the individual desires to sit in the vehicle and whether the individual desires to exit the vehicle.

12. The method of claim 11 further comprising configuring the module for executing Bluetooth protocols for creating the wireless link between the module and the wireless phone and connecting the wireless phone to the vehicle network when the individual is carrying the wireless device and desires to sit in the vehicle.

13. The method of claim 12 further comprising configuring the module for disconnecting the wireless link between the module and the wireless phone when the individual desires to exit the vehicle.

14. The method of claim 10 further comprising configuring a door switch for generating the hands-free signal.

15. The method of claim 10 further comprising configuring a motion detector for generating the hands-free signal.

16. The method of claim 10 further comprising configuring a seat weight sensor for generating the hands-free signal.

17. The method of claim 9 further comprising automatically communicating the audio component of the phone call to the vehicle network so that the phone call is carried out in a hands-free manner without requiring user action to communicate the audio component of the phone call over the speaker and microphone module.

18. A system for use with a vehicle for connecting a Bluetooth enabled wireless phone carried by an individual to a vehicle network, the system comprising:

a door sensor for generating a door open signal indicating the opening of a vehicle door;

a module connected to the vehicle network and receiving the door open signal through the vehicle network, wherein the module determines whether the individual is conducting a phone conversation using the wireless phone by transmitting a wireless inquiry signal to the phone upon receipt of the door open signal;

a Bluetooth wireless link between the module and the Bluetooth enabled wireless phone, wherein the wireless link is provided by the module in response to the module receiving the door open signal and determining the individual is conducting the phone conversation with the wireless phone, wherein the wireless link interfaces an audio component of the phone conversation with the network without disconnecting a connection between the wireless phone and a phone network external to the vehicle; and a speaker module and a microphone module connected to the vehicle network, wherein the audio component of the phone conversation is interfaced through the wireless link to the vehicle network for continuing the phone conversation within the vehicle through the speakers module and the microphone module.

* * * * *